March 18, 1958 — R. R. SPROLE — 2,827,207
FLUID MEASURING MECHANISM FOR FILLING MACHINES
Filed May 4, 1954 — 4 Sheets-Sheet 1

INVENTOR.
ROBERT R. SPROLE

March 18, 1958 R. R. SPROLE 2,827,207
FLUID MEASURING MECHANISM FOR FILLING MACHINES
Filed May 4, 1954 4 Sheets-Sheet 2

INVENTOR.
ROBERT R. SPROLE
BY

INVENTOR.
ROBERT R. SPROLE

INVENTOR.
ROBERT R. SPROLE

United States Patent Office 2,827,207
Patented Mar. 18, 1958

2,827,207

FLUID MEASURING MECHANISM FOR FILLING MACHINES

Robert R. Sprole, Ithaca, N. Y.

Application May 4, 1954, Serial No. 427,583

2 Claims. (Cl. 222—217)

This invention relates to automatic bottle filling machine such as used in large plants where a succession of bottles must be rapidly filled with a fluid under sanitary conditions. It can also be used for filling other containers, for example such as those required for transformers and other electrical components where a precise amount of oil or other fluid must be introduced. While this machine can be used with any fluid, it has particular advantages where the operating elements of the measuring pump need to be taken apart daily for cleaning or sterilizing, as required in milk filling stations for example. Such requirements preclude the use of most ordinary types of measuring or pumping machinery.

The present invention involves a pair of sweep vanes operating intermittently in certain cycles and having a type of structure that can be easily dismantled for thorough cleaning and sterilizing. The improvement resides particularly in the measuring pump itself, and the principle can be readily applied in various forms to the numerous machines by which bottles or other fluid containers are filled.

Referring now to the drawings forming part of this specification,

Fig. 5 shows the pumping vane at the end of the first measured discharge.

Fig. 6 shows the shift of both vanes to a new position preparatory to initiating the second measured discharge.

Fig. 7 shows the pumping vane at the top beginning the second measured discharge in the opposite direction.

Fig. 8 shows the pumping vane approaching the end of the second measured discharge.

Fig. 9 shows both vanes shifting back together to the initial position of Fig. 4.

Figs. 10 to 13 are somewhat similar diagrammatic cross-sectional views of a modification, in which Fig. 10 shows a pair of vanes at the start of a cycle, with the discharge port closed and the intake port open.

Fig. 11 shows the next position, with the discharge port open and one vane just beginning to sweep the fluid around the cylinder and out.

Fig. 12 shows the sweeping vane continuing to discharge the fluid.

Fig. 13 is similar to Fig. 10 except that what was the leading vane is now in the trailing position, so that another cycle can occur using the other vane as the moving element.

Similar reference numerals refer to similar parts thruout the various views.

Figure 1:
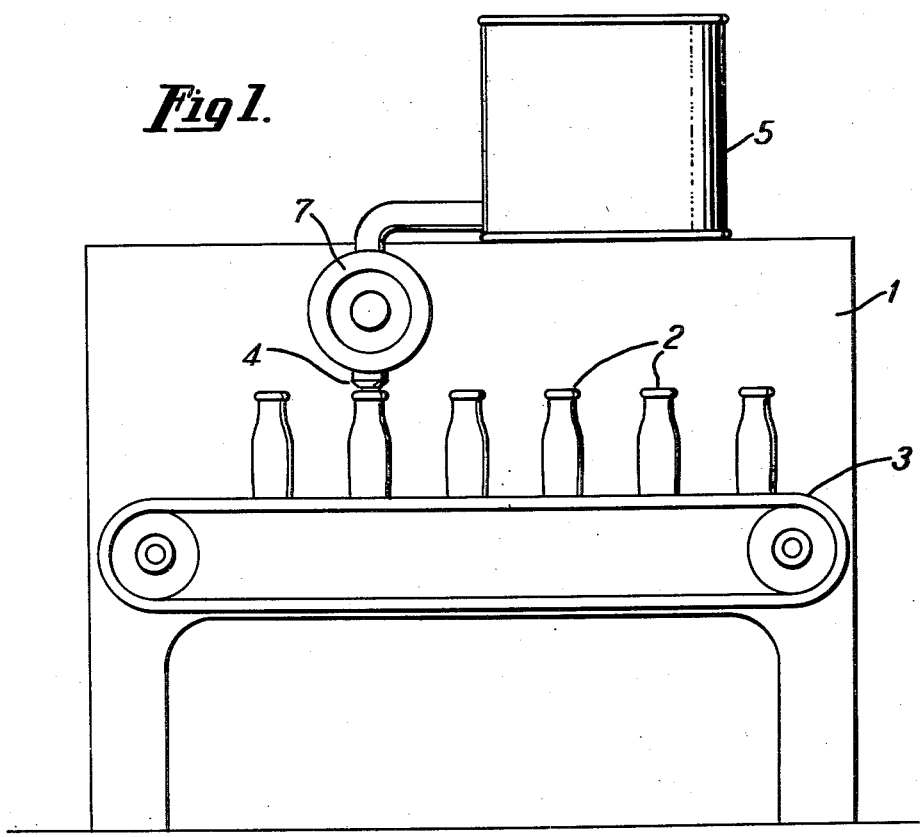
Fig. 1 is a general view in elevation of a typical bottle filling machine to which the present invention is applied.
Figure 2:
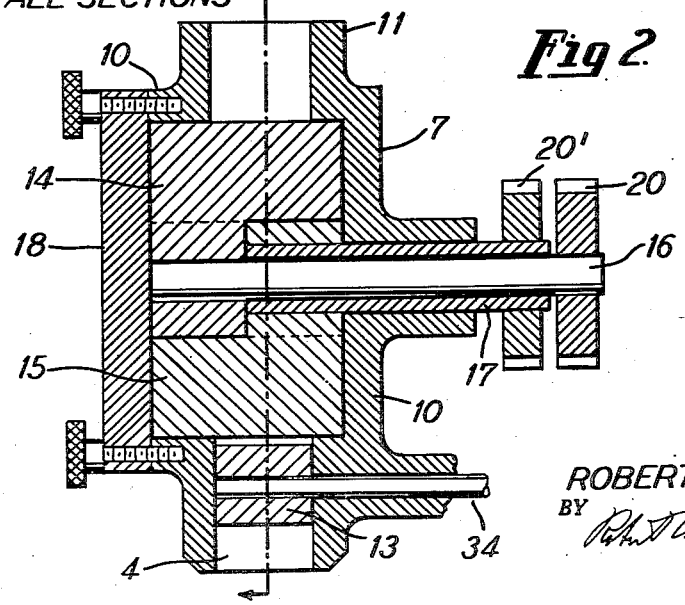
Fig. 2 is a side elevation, partly in section, showing the pump or measuring device on a larger scale.

Referring now to Fig. 1, the automatic bottle filling machine 1 usually receives its empty bottles or containers 2 on a conveyor 3 which carries them under the spout 4 to be filled from the tank 5 which contains the milk or other fluid for the containers. It is essential in such machines that each container be filled to the same rather precise amount; and so somewhere between the tank 5 and the filler spout 4 some form of positive displacement pump or meter must be employed. It need not actually pump, since the fluid may be under gravity head or other pressure, but it must at least have a definite periodic displacement so as to discharge only a certain amount of fluid into each bottle. This displacement or measuring device, some form of which is found in most filling machines, is here indicated in general by the reference numeral 7. It is in regard to this measuring device 7 that the present invention is particularly concerned. This device 7, which may be called the displacement meter, because it may be built to act either as a pump or a motor, while its inescapable function in either case is to measure, is shown in greater detail in Fig. 2 and succeeding views. It consists of a cylindrical casing 10 having an intake pipe 11 from the tank 5 and a discharge pipe or orifice 4 emptying into each bottle or container 2 that passes thru the filling machine. The pipe 4 is provided with a discharge valve 13 that is periodically opened and closed by a suitable cam from the driving mechanism. In the cylinder 10 are a pair of rotatable sweeps or vanes 14 and 15, or 14' and 15', mounted on separate shafts 16 and 17 respectively, so that they may have different motions within the cylinder. These vanes 14 and 15 are the principal operating parts of the displacement meter, are in direct contact with the fluid going to the containers, and can be lifted out for periodic cleaning and sterilizing by simply removing the end cap 18 of the cylinder 10.

The combination of motions of these vanes by which the desired amount of fluid is discharged into the containers is illustrated diagrammatically in Fig. 4 to Fig. 13 inclusive. The vanes or sweeps may be of different thickness in different installations and in some cases may have different directions of rotation. For example, in Fig. 4 to Fig. 9 inclusive one vane 14 is a relatively thin sector while the vane 15 is substantially a half cylinder. These vanes operate thru a cycle of movements giving two different discharge motions per complete cycle, during which the direction of motion is reversed. The vanes 14' and 15' illustrated in Fig. 10 to Fig. 13 inclusive are about the same thickness, neither being as thick as the vane 15 of Fig. 3, and operate without the reversing of rotation. In either case there is a definite displacement of a certain volume of fluid by a successive pair of different motions between the vanes, the complete cycle of operations delivering two separate and equal discharges.

Figure 4:
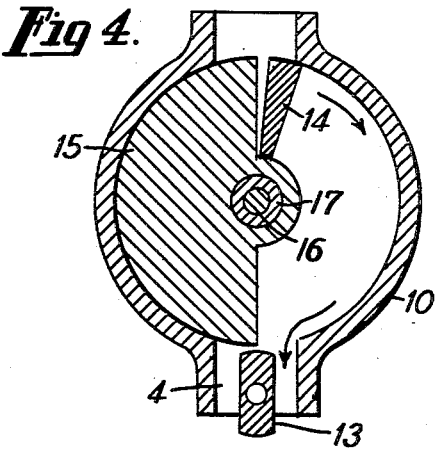
Fig. 4 to Fig. 9 are cross-sectional views taken transversely thru the cylinder of Fig. 2 as indicated, showing diagrammatically the successive positions of the operating vanes, with Fig. 4 showing the start of a cycle.

Referring now to Fig. 4 to Fig. 9 inclusive in which one vane 15 is substantially a half cylinder, and starting with the relative position shown in Fig. 4, it will be seen that then the larger vane 15 substantially fills the left side of the casing 10, while the thinner vane 14 is adjacent to it at the top. The rest of the casing is full of the fluid, such as milk for example. The valve 13 is then opened and the vane 14 swings down a half turn in a clockwise direction, while vane 15 remains stationary. The vane 14 thus sweeps out the milk in that half of the casing 10, while more milk flows in behind it, keeping the casing 10 full. At the end of this operation the two vanes or sweeps are in the position shown in Fig. 5, with the vane 14 adjacent the vane 15 but at the bottom.

Figure 5:
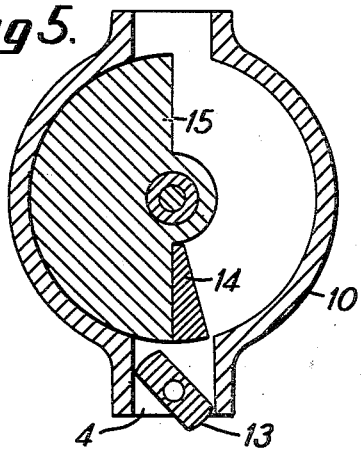
Figure 6:
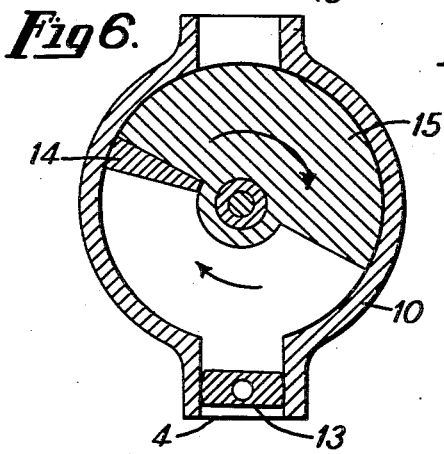
Figure 7:
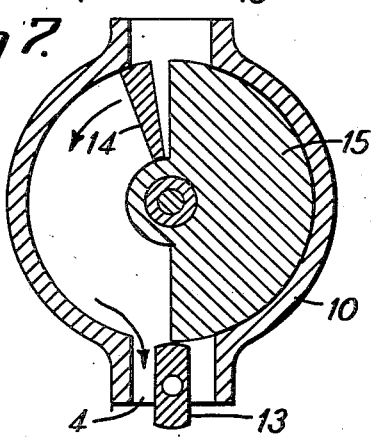

After the vanes reach the position shown in Fig. 5, the discharge valve is closed and both vanes 14 and 15 then continue clockwise as shown in Fig. 6 thru a half turn to the position shown in Fig. 7 in which the vane 15 is shifted to the right hand side of the casing 10, substantially filling that side, while the thinner vane 14 turning with the vane 15 has been brought to the top of the casing 10 but on the left side now instead of the right. This joint rotation of the vanes or sweeps 14 and 15 has carried with it the volume of milk trapped in the casing behind the vane 14 when the discharge valve 13 was closed, so that milk as shown in Fig. 7 is on the left side of the casing and ready to be discharged.

Figure 8:
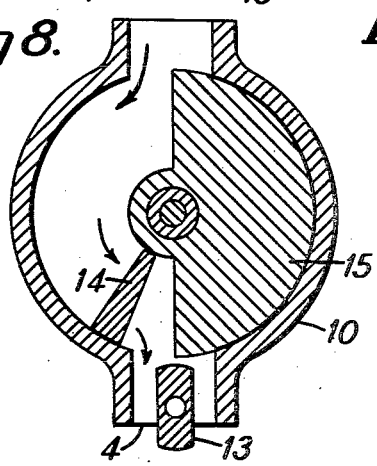
Figure 9:
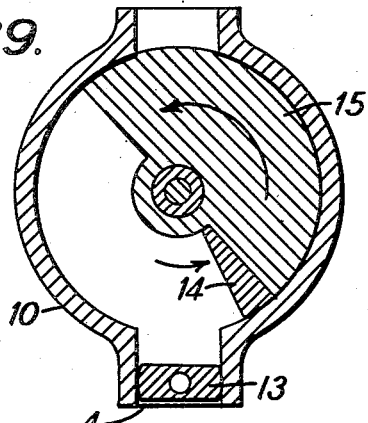

This discharge is now effected by opening the valve 13 and swinging the vane or sweep 14 down in a counter-clockwise direction while the larger vane 15 remains stationary. At the end of this stroke, as shown in Fig. 8, the vane 14 is at the bottom again adjacent the vane 15 and the milk has been moved out of the orifice 4 while more milk has flowed in behind the vane 14, keeping the casing full at all times.

After this second delivery stroke the discharge valve 13 is again closed and both sweeps 14 and 15 turn together, this time in a counter-clockwise direction so as to continue the motion of the vane 14, and return to the initial position shown in Fig. 4 from which another similar cycle can be started.

Figure 10:
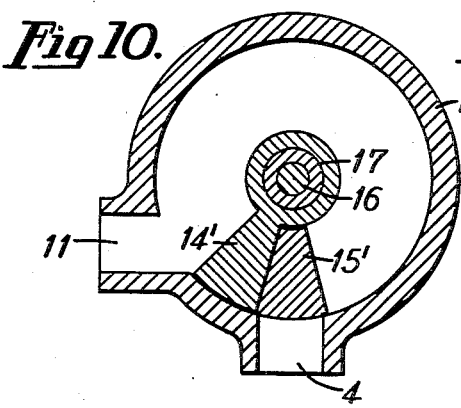
Figure 11:
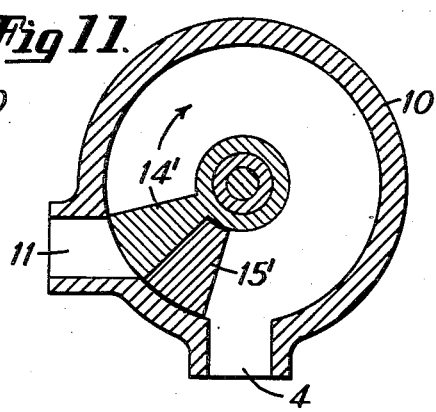
Figure 12:
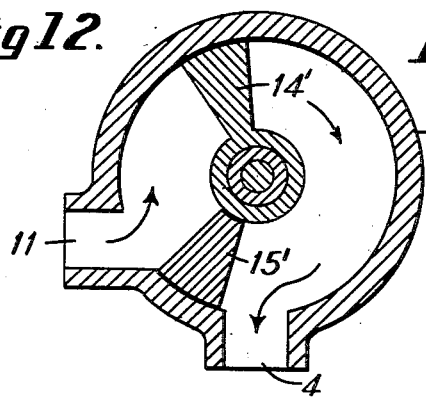
Figure 13:
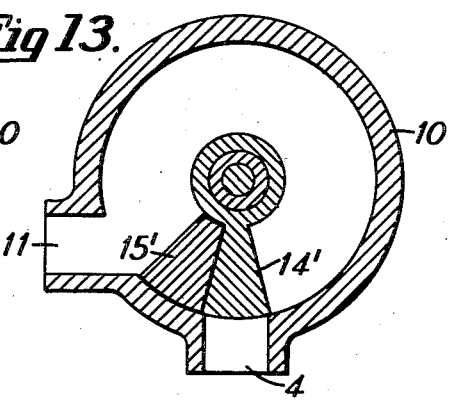

In the modification shown in Fig. 10 and Fig. 13 inclusive the vanes 14' and 15' are substantially of equal thickness, and the intake pipe 11 and discharge pipe 4 are closer together. Referring now to Fig. 10, the casing 10 is full of milk or other fluid to be put in the containers, the vanes 15' and 14' are close together, with the vane 14' just short of the opening from the intake pipe 11 while the vane 15' covers the discharge pipe 4. Both vanes 14' and 15' move together in a clockwise direction, with the vane 14' momentarily closing the intake 11; and at the same time the vane 15' opens the discharge 4 as shown in Fig. 11. The trailing vane 15' then dwells between the two pipes 1 and 4 so as to continue to block direct flow between them, while the vane 14' continues on in a clockwise direction for almost a complete rotation, sweeping the milk before it and out the discharge pipe 4 as shown in Fig. 12.

At the end of that stroke the vane 14' comes in contact again with the temporarily stationary vane 15', but this time the vane 14' is behind the vane 15' instead of in front of it. This is shown in Fig. 13, and is a similar position to that shown in Fig. 10 to begin with, except for the interchange of the vanes 14' and 15' relative to each other. The fluid can now be propelled out of the casing by letting the vane 15' go thru the same motion that the sweep 14' previously accomplished in Fig. 10 to Fig. 13 described. Such an operation will bring the vane 15' back to its initial position as shown in Fig. 10, that is, behind the vane 14'. There are thus two measured discharges in a complete operating cycle.

In this latter case it has been unnecessary to reverse the motion of the sweeps 14' and 15', since the intermittent motion required is always in the same direction of rotation. In all cases however, under this invention, it is essential that some form of intermittent drive be provided for the shafts 16 and 17, since the operation depends on stopping one vane or sweep to block the movement of the fluid in one direction while the other vane or sweep rotates to carry the fluid out the discharge port; while at other times in the cycle both vanes move together to shift the fluid around internally of the casing without discharge to prepare for another filling operation.

Figure 3:
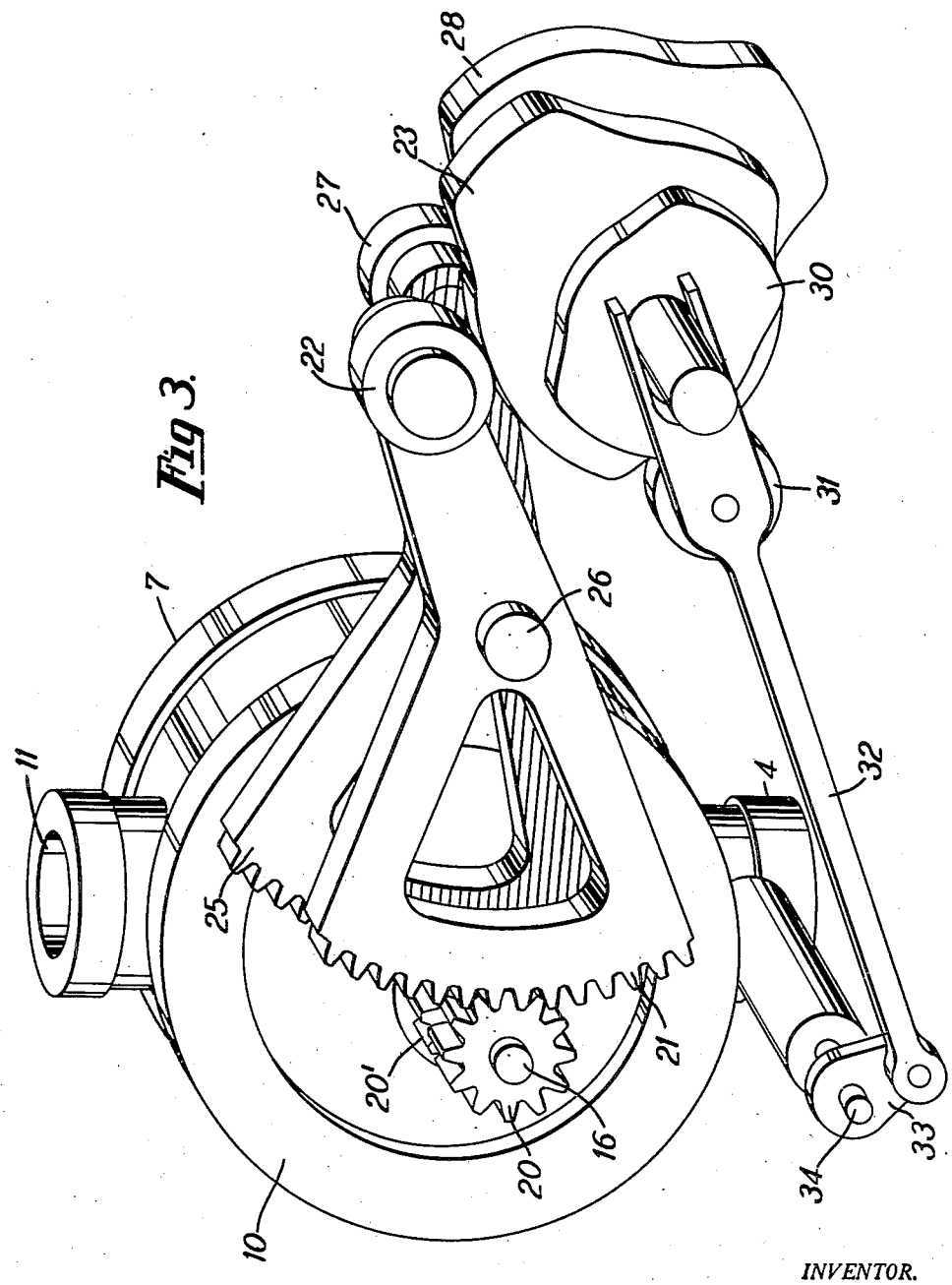
Fig. 3 illustrates one form of drive which can be used to provide the intermittent motion for the sweeps or vanes.

In Fig. 3 a driving mechanism of the cam type is shown for purposes of illustration, though the sweeps could be equally well operated by any intermittent drive as are common to many machines, such as intermittent gears for example having driving teeth on only part of their periphery, or reversible motors with reversing switches of the automatic type if an electric drive is desired. In Fig. 3 the inner sweep shaft 16 for the vane 14 has a gear 20 which is rotated by the quadrant 21 actuated by the follower 22 rolling on the irregular cam 23 which is designed to give the desired motions and dwells. The hollow shaft 17 for the other sweep 15 has a gear 20' which is rotated by the quadrant 25, pivoted like the quadrant 21 on the shaft 26, and actuated by the follower 27 rolling on the irregular cam 28, which is designed to give the various movements and dwells indicated by the diagrams described. A third cam 30 having the follower 31 reciprocates the connecting rod 32 to oscillate the crank 33 which turns the shaft 34 to open and close the valve 13 in the discharge spout 4.

Figure 14:
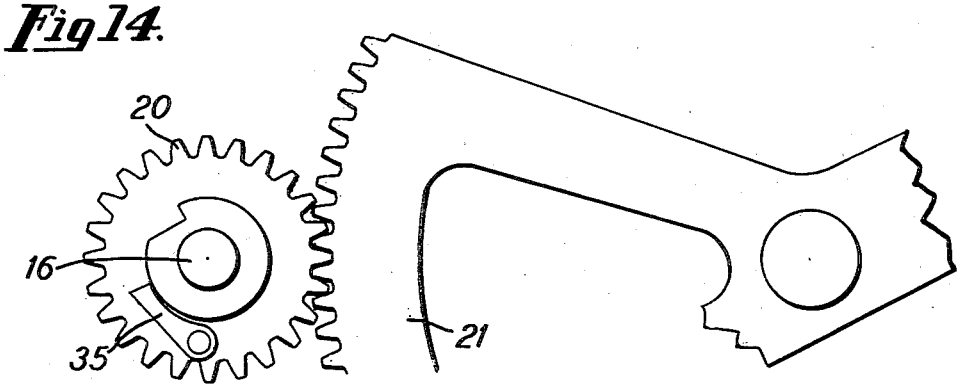
Fig. 14 illustrates a ratchet mechanism by which the driving mechanism shown in Fig. 3 can supply intermittent rotation in one direction if desired, as for example in Fig. 10 to Fig. 13.

In the modification whose operation was illustrated in Fig. 10 to Fig. 13 above, the intermittent rotation of the sweeps generally occurs in the same direction so that no reversal is required. This can be accomplished by intermittent gears or electrically, as will be apparent to those skilled in the art; but for simple illustration there is shown in Fig. 14 a ratchet drive 35 for the gear 20 on the vane shaft 16. A similar ratchet can drive the gear 20' and the shaft 17 (shown in Fig. 3). By this or equivalent means the oscillating motion of the quadrants 21 and 25 is converted to a rotary motion always in the same direction.

While a discharge valve 13 is generally used, it may be omitted by putting the discharge port 4 at the top instead of the bottom so that the milk will not run out, or by using one internal sweep or vane to cover the discharge port when the other vane is returning to a new driving position. For example, referring to Fig. 5, if both vanes 14 and 15 then turn counter-clockwise instead of clockwise to attain the position shown in Fig. 7, the vanes will have covered the discharge port during that operation so that the valve 13 could be omitted. Also in Fig. 10 to Fig. 14, a vane can cover the discharge port and so act as a valve, and the valve 13 could then be omitted if desired.

It will be seen from the foregoing that by the use of two sweeps having different intermittent motions so as to create variable relations between them a fluid can be transmitted and precisely measured by a mechanism which lends itself to easy cleaning, inspection and assembly.

While I have in the foregoing described certain specific forms by way of example, it will be understood that they are merely for the purpose of illustration to make clear the principles of the invention, which is not limited to the particular forms shown but is susceptible to various modifications and adaptations in different installations as will be apparent to those skilled in the art without departing from the scope of the invention as stated in the following claims.

1. In a machine for filling containers with a fluid, the combination of a casing having a cylindrical bore, said casing having an intake port and a discharge port, a removable cover for said casing, a vane sweep mounted for rotation within said cylindrical bore whereby the fluid is moved in thru the intake port and out thru the discharge port, a valve in said discharge port, a displacement sweep larger than the vane sweep and also mounted for rotation within said cylindrical bore whereby when said valve is closed the fluid is transferred from one side of the casing to the other, an intermittent motion mechanism for driving the vane sweep and the displacement sweep in different cycles, the conjoint action of said sweeps first moving the fluid out the discharge port when the valve is open by action of the vane sweep while the displacement sweep blocks the movement of the fluid elsewhere, then moving the two sweeps together to the opposite side of the casing from the first position while the valve is closed, thus transferring the fluid in the casing to the other side, and then opening the valve and moving out the fluid from said other side by means of the vane sweep while the displacement sweep blocks movement of the fluid elsewhere, each stroke of the vane sweep transferring out of the discharge port an amount of fluid to fill the container.

2. In a machine for filling containers with a fluid, the combination of a casing having a cylindrical bore, said casing having an intake port and a discharge port, a removable cover for said casing, a vane sweep mounted for rotation within said cylindrical bore whereby the fluid is moved in thru the intake port and out thru the discharge port, a displacement sweep larger than the vane sweep and also mounted for rotation within said cylindrical bore whereby the fluid is transferred from one side of the casing to the other, an intermittent motion mechanism for driving the vane sweep and the displacement sweep in different cycles, the conjoint action of said sweeps first moving the fluid out of the discharge port by action of the vane sweep while the displacement sweep blocks the movement of the fluid elsewhere, then moving the two sweeps together in a reverse direction to the opposite side of the casing from the first position thus transferring the fluid in the casing to the other side, and then moving out the fluid from said other side by means of the vane sweep moving in a reverse direction of rotation from its first action while the displacement sweep blocks movement of the fluid elsewhere, each stroke of the vane sweep transferring out of the discharge port an amount of fluid to fill the container.

References Cited in the file of this patent

UNITED STATES PATENTS

| | | |
|---|---|---|
| 304,063 | Barker | Aug. 26, 1884 |
| 791,611 | Demerath | June 6, 1905 |
| 1,708,482 | McClatchie | Apr. 9, 1929 |